US012265532B2

(12) United States Patent
Shergill et al.

(10) Patent No.: US 12,265,532 B2
(45) Date of Patent: Apr. 1, 2025

(54) ACCELERATING QUERY EXECUTION BY OPTIMIZING DATA TRANSFER BETWEEN STORAGE NODES AND DATABASE NODES

(71) Applicant: Oracle International Corporation, Redwood Shores, CA (US)

(72) Inventors: Kamaljit Shergill, Maidenhead (GB); Ken Kumar, Karnataka (IN); Aurosish Mishra, Foster City, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 18/072,222

(22) Filed: Nov. 30, 2022

(65) Prior Publication Data

US 2024/0126750 A1 Apr. 18, 2024

Related U.S. Application Data

(60) Provisional application No. 63/416,462, filed on Oct. 14, 2022.

(51) Int. Cl.
*G06F 16/24* (2019.01)
*G06F 16/22* (2019.01)
*G06F 16/2453* (2019.01)

(52) U.S. Cl.
CPC ...... *G06F 16/2453* (2019.01); *G06F 16/2246* (2019.01)

(58) Field of Classification Search
CPC ................ G06F 16/2453; G06F 16/2246
See application file for complete search history.

(56) References Cited

U.S. PATENT DOCUMENTS

| 6,006,232 A | 12/1999 | Lyons |
| 6,859,808 B1 | 2/2005 | Chong |
| 7,437,523 B1 * | 10/2008 | Ting .................... H04L 67/1095 |
| | | 711/161 |

(Continued)

OTHER PUBLICATIONS

Swanson, Nancy, "What Is Smart Scan?", Cloud-Ready Infrastructure Blog, https://blogs.oracle.com/infrastructure/post/what-is-smart-scan, dated Feb. 4, 2020, 5 pages.

(Continued)

*Primary Examiner* — Eliyah S. Harper
(74) *Attorney, Agent, or Firm* — Hickman Becker Bingham Ledesma LLP

(57) ABSTRACT

Techniques for accelerating query execution by optimizing data transfer between storage nodes and database nodes are provided. In one technique, a compute node receives a database statement and transmits a set of one or more selection criteria associated with the database statement to a storage node. Based on the database statement, the storage node retrieves a set of data blocks from storage. Each data block comprises multiple rows of an index-organized table (IOT), each row comprising a key section and a non-key section. The storage node applies the set of selection criteria to a data block, resulting in a modified data block. The storage node generates a modified header data for the modified data block and transmits the modified data block to the compute node.

28 Claims, 8 Drawing Sheets

(56) References Cited

U.S. PATENT DOCUMENTS

| | | |
|---|---|---|
| 2006/0036633 A1 | 2/2006 | Chong |
| 2006/0179071 A1 | 8/2006 | Panigrahy |
| 2007/0079296 A1 | 4/2007 | Li |
| 2011/0274204 A1* | 11/2011 | Ko .................. H04L 5/0007 |
| | | 375/295 |
| 2011/0274211 A1* | 11/2011 | Ko .................. H04L 27/2602 |
| | | 332/149 |
| 2011/0280327 A1* | 11/2011 | Ko .................. H04L 5/0053 |
| | | 375/260 |
| 2011/0286535 A1* | 11/2011 | Ko .................. H04H 40/00 |
| | | 375/259 |
| 2011/0299628 A1* | 12/2011 | Ko .................. H03M 13/2792 |
| | | 375/320 |
| 2012/0054161 A1 | 3/2012 | Fusco |
| 2012/0296881 A1 | 11/2012 | Christian |
| 2014/0074805 A1 | 3/2014 | Kapoor |
| 2016/0179896 A1 | 6/2016 | Finlay |
| 2016/0292037 A1* | 10/2016 | Kandukuri .............. G06F 16/27 |
| 2016/0292049 A1* | 10/2016 | Kandukuri .............. G06F 11/00 |
| 2017/0116280 A1 | 4/2017 | Shergill |
| 2019/0034466 A1 | 1/2019 | Kim |
| 2019/0364459 A1* | 11/2019 | Lee .................. H04W 28/10 |
| 2020/0097571 A1 | 3/2020 | Mathur |
| 2021/0391990 A1 | 12/2021 | McElveen |
| 2022/0050628 A1* | 2/2022 | Basu .................. G06F 3/0688 |
| 2022/0292543 A1* | 9/2022 | Henderson ......... G06Q 30/0252 |

OTHER PUBLICATIONS

Kumar, U.S. Appl. No. 18/137,321, filed Apr. 20, 2023, Non-Final Rejection mailed May 1, 2024.

\* cited by examiner

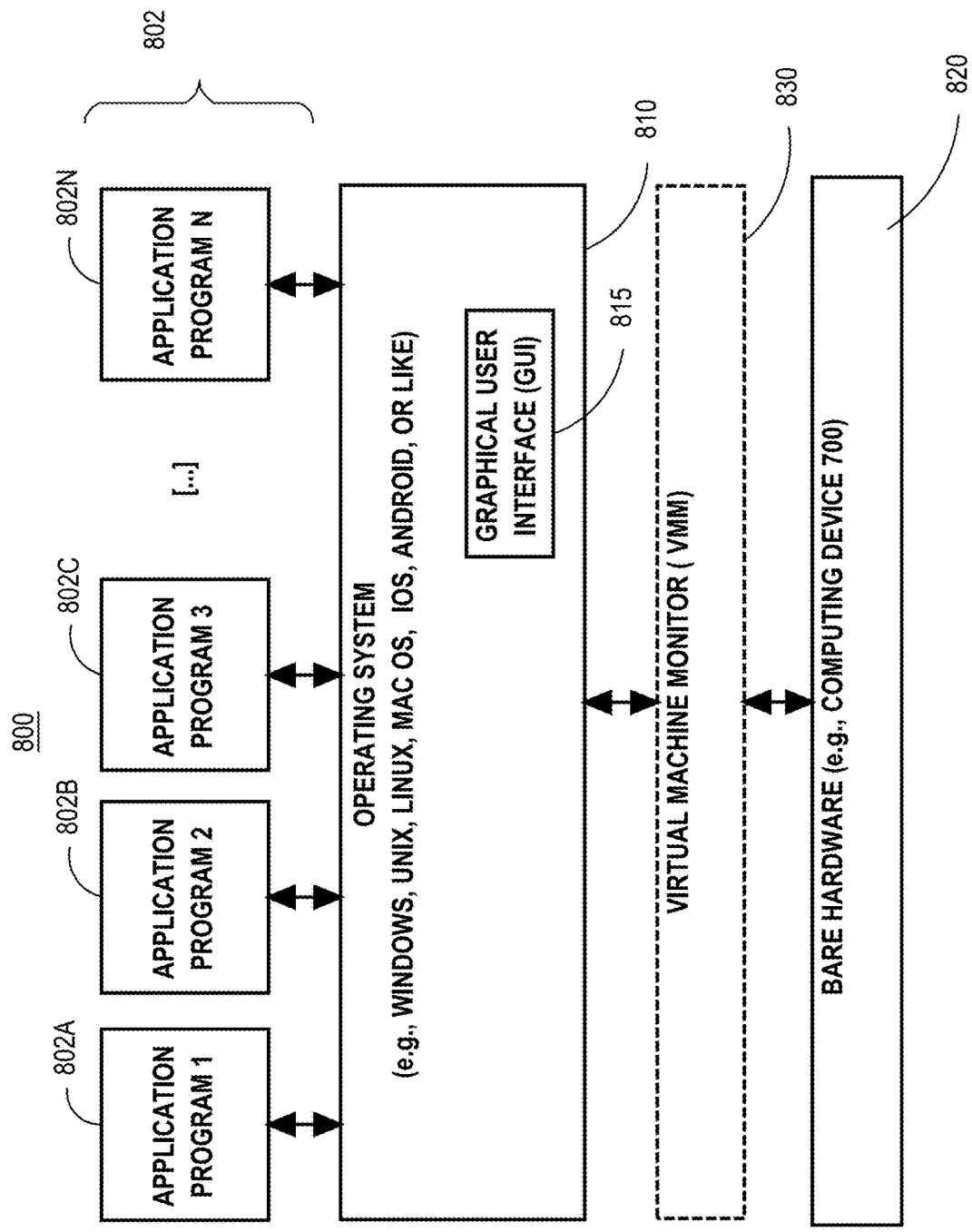

ACCELERATING QUERY EXECUTION BY OPTIMIZING DATA TRANSFER BETWEEN STORAGE NODES AND DATABASE NODES

PRIORITY CLAIM

This application claims the benefit of Provisional Application 63/416,462, filed Oct. 14, 2022, the entire contents of which is hereby incorporated by reference as if fully set forth herein, under 35 U.S.C. § 119(e).

TECHNICAL FIELD

The present disclosure relates to database query execution and, more particularly, to optimizing data transfer between database nodes and storage nodes during query execution.

BACKGROUND

Reducing query execution time in database systems is critical, especially as the amount of data to search increases, as the complexity of the types of questions that may be asked of database systems increases, and as user expectations increase.

One part of the query processing pipeline that may have a significant impact on query execution time is data transfer between a storage node (that has direct access to stored data) and a database (or compute) node, which processes a database statement against the data returned by the storage node. However, current approaches rely on storage nodes to simply pass targeted data blocks from storage to compute nodes to process the entirety of a database statement.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 8 is a block diagram of a basic software system that may be employed for controlling the operation of the example computer system, in an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for accelerating query execution by optimizing data transfer between database (or compute) nodes and storage nodes are provided. In one technique, a storage node applies evaluation criteria (e.g., predicate filters, projections) from a database statement to data blocks that are retrieved from storage and modifies the data blocks, such as reshaping the data blocks and modifying the block headers. The modified block header allows a compute node to interpret the modified data block properly. Examples of modifications that a storage node may make to a data block include truncating columns, dropping non-key sections, dropping overflow segments, nulling columns, reducing the number of rows in the data block, applying filters on a per-row basis, and modifying a compression status.

Embodiments improve computer technology by reducing the amount of data that is transmitted from a storage node to a compute node. This extra processing by the storage node lessens network traffic, reduces the amount of processing that the compute node is required to perform, and reduces latency of query processing.

System Overview

Figure 1:
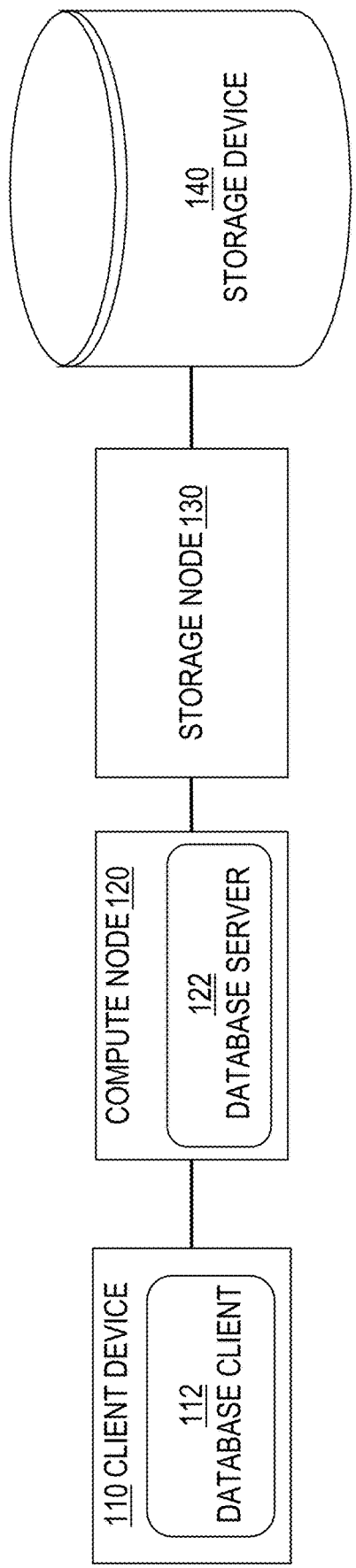
FIG. 1 is a block diagram that depicts an example database system for processing queries, in an embodiment.

FIG. 1 is a block diagram that depicts an example database system 100 for processing queries, in an embodiment. Database system 100 comprises at least four entities: a client device 110 (that hosts a database client 112), a compute node 120 (that hosts a database server 122), a storage node 130, and a storage device 140. Although only a single instance of each entity is depicted, database system 100 may comprises multiple client devices, multiple compute nodes, multiple storage nodes, and/or multiple storage devices. Additionally or alternatively, compute node 120 may host multiple database servers that execute concurrently and can process database statements in parallel with each other.

Client device 110 is communicatively coupled to compute node 120. Client device 110 and compute node 120 may be located in the same network or subnet or may be connected via a wide area network (WAN) or the Internet. Database client 112 transmits database statements to compute node 120. Examples of database statements include data definition language (DDL) statements (such as create table, create index, create IOT), data manipulation language (DML) statements that update data in a database (e.g., delete, modify, and insert), and queries that request data from the database. Database statements may conform to one of multiple languages, an example of which is Structured Query Language (SQL) and its variants.

A database statement may be composed based on input from a user. For example, a user provides input (e.g., through a user interface on client device 110) to database client 112, which translates the input into a database statement that compute node 120 recognizes and can process.

Compute node 120 comprises a database server 122 that receives and processes database statements. While processing database statements, database server 122 sends data requests to storage node 130. A data request may identify one or more database objects (identified in the corresponding database statement) to retrieve, such as a table, an index, an index-organized table (IOT). A data request may identify one or more predicates from the corresponding database statement, such as a column value or range of column values, names of columns to return, etc.

Storage node 130 retrieves data blocks from storage device 140 in response to data requests from compute node 120. As described in more detail herein, storage node 130 may process retrieved data blocks before transmitting those data blocks (or modified versions thereof) to compute node 120. Examples of storage device 140 include a hard disk drive (HDD) and a solid state drive (SSD), such as Flash.

Storage device 140 stores data in data blocks, each of which is a contiguous area of persistent (or non-volatile) memory. Each data block has a unique data block address (DBA) through which the data block may be referenced. A data block may have a fixed size, such as 8 KB. The format of a data block may vary depending on the type of data stored in the data block. For example, a data block may store rows of a table, entries of an index (e.g., a B-tree index), or rows of an index-organized table (IOT).

Each data block is associated with a header that informs the node that processes the data block about the type of data within the data block and how it is organized. For example, a header for a data block may indicate that the data block contains rows of a table, an index, or an IOT. As another example, a header for a data block may indicate whether the data within the data block is compressed and the type of compression used, if any. As another example, a header for a data block may indicate the number of columns and their respective sizes.

Index-Organized Table

An IOT has a storage organization that is a variant of a primary B-tree. Unlike an ordinary (heap-organized) table whose data is stored as an unordered collection (heap), data for an IOT is stored in a B-tree index structure in a primary key sorted manner. Each leaf block in the index structure stores both the key and monkey columns. An IOT is stored in one or more data blocks, each data block containing one or more rows of the IOT. Each data block includes a block header that indicates the number of key columns for each row.

Figure 2:
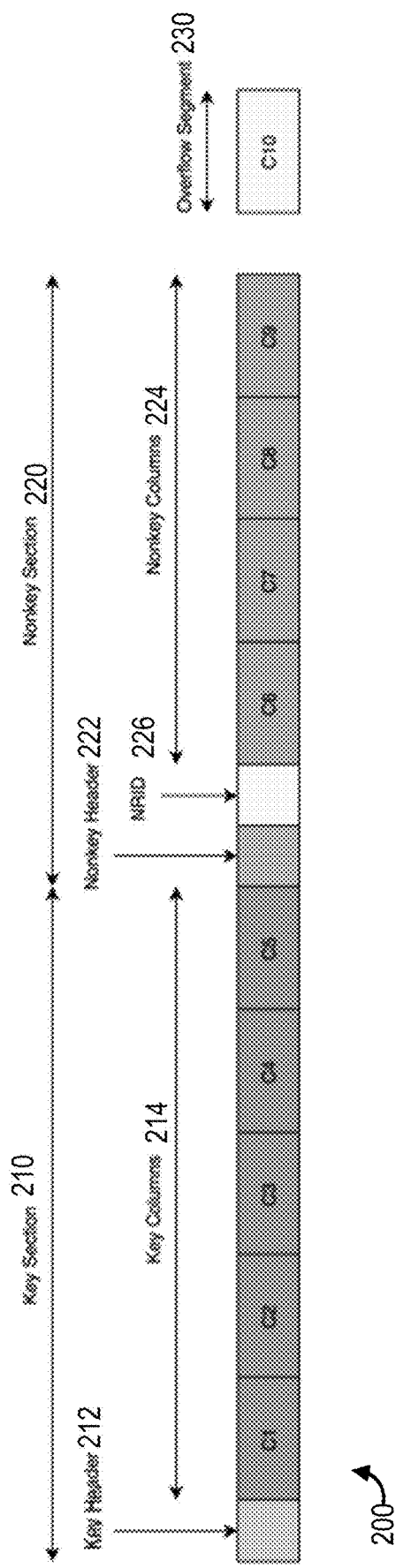
FIG. 2 is a block diagram that depicts an example row of an index-organized table, in an embodiment.

FIG. 2 is a block diagram that depicts an example row of an IOT, in an embodiment. This IOT may have been created based on the following create database statement:
   create table tiot1 (c1 number, c2 integer, c3 number, c4 number, c5 number, c6 number, c7 integer, c8 number, c9 number, c10 number, primary key (c1,c2,c3,c4,c5))
      organization index [which means that this table is to be stored as an IOT] including c9 [which means that c9 must be in the index segment of a row] overflow;

Another way to declare an overflow segment is to specify a percentage threshold value. If a column causes a row to cross that percentage threshold value, then the column will be stored in an overflow segment. An example of a create database statement for an IOT that involves a percentage threshold specification is as follows:
   create table tiot2 (c1 number, c2 number, c3 varchar2 (2000), c4 varcar2(2000), primary key (c1, c2))
      organization index [which means that this table is to be stored as an IOT]
      pctthreshold 10 [which means if a column exceeds the 10% threshold, then the column will be stored in an overflow segment]

overflow;

Row 200 includes a key section 210 and a non-key section 220. Each section includes one or more columns. For example, key section 210 corresponds to columns C1-C5 (which are key columns 214) while non-key section 220 corresponds to columns C6-C9 (which are non-key columns 224).

Each row in an IOT includes an index segment and an optional overflow segment to store column data that, if included in the index segment, would exceed a maximum size for the row. In other words, an overflow segment stores column data that is unable to fit into the index segment of the corresponding row. An overflow segment includes column data for one or more columns. Overflow segment 230 in FIG. 2 is an example of an overflow segment that stores data for column C10. An overflow segment may result from columns with variable character strings that vary in length from row to row. In other words, if there is a large column value for one or more columns, then column data for those columns may reside in an overflow segment. Thus, some rows of an IOT may be large enough in bytes that they each require an overflow segment while other rows of the IOT may not require an overflow segment. Due to the scenario where data for a column may reside in an index segment for some rows and may reside in an overflow segment for other rows, each row has a non-key header that indicates the number of non-key columns for that row. In other words, it is possible for different rows in the same data block to have a different number of non-key columns.

If a row has an overflow segment, then the row includes an overflow reference (e.g., NRID 226 in FIG. 2) that indicates where the overflow segment is stored in storage device 140, i.e., in a data block that is different than the data block that stores the corresponding index segment. An index segment includes the entire key section. Thus, an overflow segment, if one exists for a row, stores at least a portion of the non-key section.

In an embodiment, each row of an IOT includes a key header and a non-key header, such as a key header 212 for row 200 and a non-key header 222 for row 200. Key header 212 is part of key section 210 and non-key header 222 is part of non-key section 220. A key header includes a flag that indicates whether there is a non-key section for the corresponding row. A key header also includes lock data (e.g., a bit or a byte) that indicates whether the corresponding row (or key section) is locked.

In an embodiment, each key column in a key section of a row includes a length value and column data. The length value indicates how long the column data is. Examples of data types of column data include number, integer, date, time, Boolean, and variable character string.

In an embodiment, a non-key header for a non-key section includes flag data that indicates whether there is an overflow segment. A non-key header may also include a column count that indicates the number of columns that follow the non-key header.

While embodiments are described in the context of IOTs, all embodiments are not limited to IOTs, but also apply to tables and indexes.

Query Evaluation

In one approach to processing a database statement that targets data stored in storage device 140, storage node 130 retrieves one or more base database objects (e.g., one or more tables, indexes, and/or IOTs) that, collectively, contain all the data that the database statement targets. Storage node 130 then returns the retrieved base database objects (in the form of data blocks) to compute node 120 for processing, such as evaluating any filter predicates or column projections. In other words, a database statement comprises one or more selection criteria (or query evaluation criteria), examples of which include filter predicates and column projections.

In an embodiment, in response to a data request from compute node 120, storage node 130 performs query evaluation on data blocks that storage node 130 retrieves from storage device 140. Such query evaluation is performed prior to transmitting a modified data block to compute node 120 in response to the data request. The data request includes one or more query evaluation criteria for storage node 130 to evaluate on one or more data blocks.

In the following description, a data block that storage node 130 retrieves from storage device 140 is referred to as an "input data block" and the data block that storage node 130 transmits to compute node 120 after performing query evaluation on the input data block is referred to herein as an "output data block." Because embodiments result in data reduction, query evaluation on multiple input data blocks may result in a single output data block. Reference herein to changes to an input data block (e.g., removing or deleting data or modifying existing data) does not necessarily mean that the corresponding data block in storage device 140 is updated. Instead, reference to changes to an input data block means that either (a) the input data block (which is in volatile memory of storage node 130) is changed and/or (b) a strict subset of the data in the input data block is moved to an output data block.

Types of Query Evaluation

One type of query evaluation results in removing rows from an input data block. Such query evaluation involves evaluating one or more filter predicates in a query or database statement. For example, if an input data block contains one hundred rows, then predicate evaluation results in copying only ten of those rows into an output data block, instead of also copying the other ninety rows and labeling or tagging them as deleted in the output data block. An example of a predicate that results in fewer rows is "C1>23," where C1 is one of the columns in the database object, whether an index, table, or IOT.

In a related embodiment, storage node 130 determines, on a per-row basis, whether a column (on which a filter predicate applies) exists in an overflow segment of a row. If so, then storage node 130 does not apply that filter predicate to that row because the column resides in a different data block and a reference to that data block is returned to compute node 120, which will apply the filter predicate. If the column does not exist in an overflow segment, then storage node 130 applies the filter predicate on that column. If storage node 130 determines that there are no overflow segments in an input data block or that none of the overflow segments in an input data block include the column, then this checking of the column on a per-row basis may be skipped or avoided.

In a related embodiment where a predicate exists on a column that is in an overflow segment of a row, storage node 130 uses the overflow reference in that row to retrieve the overflow segment and then evaluate the predicate.

In a related embodiment where a database statement specifies multiple predicates on multiple columns (where there is a conjunction, or AND, that combines the predicates) and at least one of the columns is in an overflow segment, storage node 130 evaluates the predicate(s) on columns that are not in an overflow segment while compute node 120 evaluates the predicate(s) on columns that are in an overflow segment. For example, a database statement states the following in a WHERE clause: c2>0 AND c10>0. Column c2 is in the index segment and column c10 is in an overflow segment. Storage node 130 applies predicate c2>0 on all rows in an input data block and then stores rows that pass that filter predicate in an output data block. Compute node 120 evaluates c10>0 (but not c2>0) on the rows in the output data block, which rows may be much fewer in number than the rows that were filtered out.

Another type of query evaluation results in removing columns from rows that are identified in a set of predicates that storage node 130 receives from compute node 120. Such column removal is referred to as "projection" or "truncation." Identification of which columns to project or truncate may involve storage node 130 determining which columns are involved in the query (or just identifying the projected columns if no further predicate evaluation is required). For example, compute node 120 receives a database statement whose select clause indicates only columns C1 and C2 and transmits, to storage node 130, a data request that identifies C1 and C2 as select columns. In response to receiving the data request, storage node 130 identifies columns C1 and C2 and determines that any columns subsequent to those two columns in a row are to be truncated (unless there is a predicate on one or more of those to-be-truncated columns, which predicate would need to be applied first before truncation). In other words, the to-be-truncated columns are excluded from one or more output data blocks that storage node 130 generates based on one or more input data blocks. Depending on the size of each row (e.g., index segment), a significant reduction in the amount of data may be achieved through truncation. As described in more detail below, in the context of IOTs, truncation may involve removing columns of the key section of a row and/or removing some columns, or the entirety, of the non-key section of the row.

In an embodiment, in a modification scenario, a header of an output data block is generated that indicates a number of columns in the rows in the output data block. Thus, the header of the output data block is different than the header of the input data block. For example, the header of an input data block indicates ten columns while the header of a corresponding output data block indicates three columns. Also, any changes to the compression scheme of an input data block are described in the updated header of the corresponding output data block.

In a modification embodiment, if one or more columns in a key section are not needed ("unneeded columns") based on query evaluation, but those unneeded columns precede one or more other key columns that are needed ("needed columns"), then the values of those unneeded columns are NULLed. Such "nulling" may significantly reduce the size of the rows that are inserted into an output data block.

In an embodiment where some rows have one or more non-key columns in their respective overflow segment and other rows have the same non-key columns in their respective index segment, column truncation may involve updating metadata on a row-by-row basis. For example, a non-key header for a row may be updated (in an output data block) to indicate a number of non-key columns for that row if the number of non-key columns changed for that row. If all the truncated column(s) only resided in an overflow segment for a row, then the non-key header (in the output data block) would indicate the same number of non-key columns as the corresponding non-key header in the input data block. As another example, if storage node 130 determines that an overflow segment of a row contains all truncated columns, then storage node 130 excludes an overflow reference in that row such that the output row (i.e., destined for the output data block) does not include an overflow reference.

Example Modifications in Response to Predicate Evaluation

Figure 3:
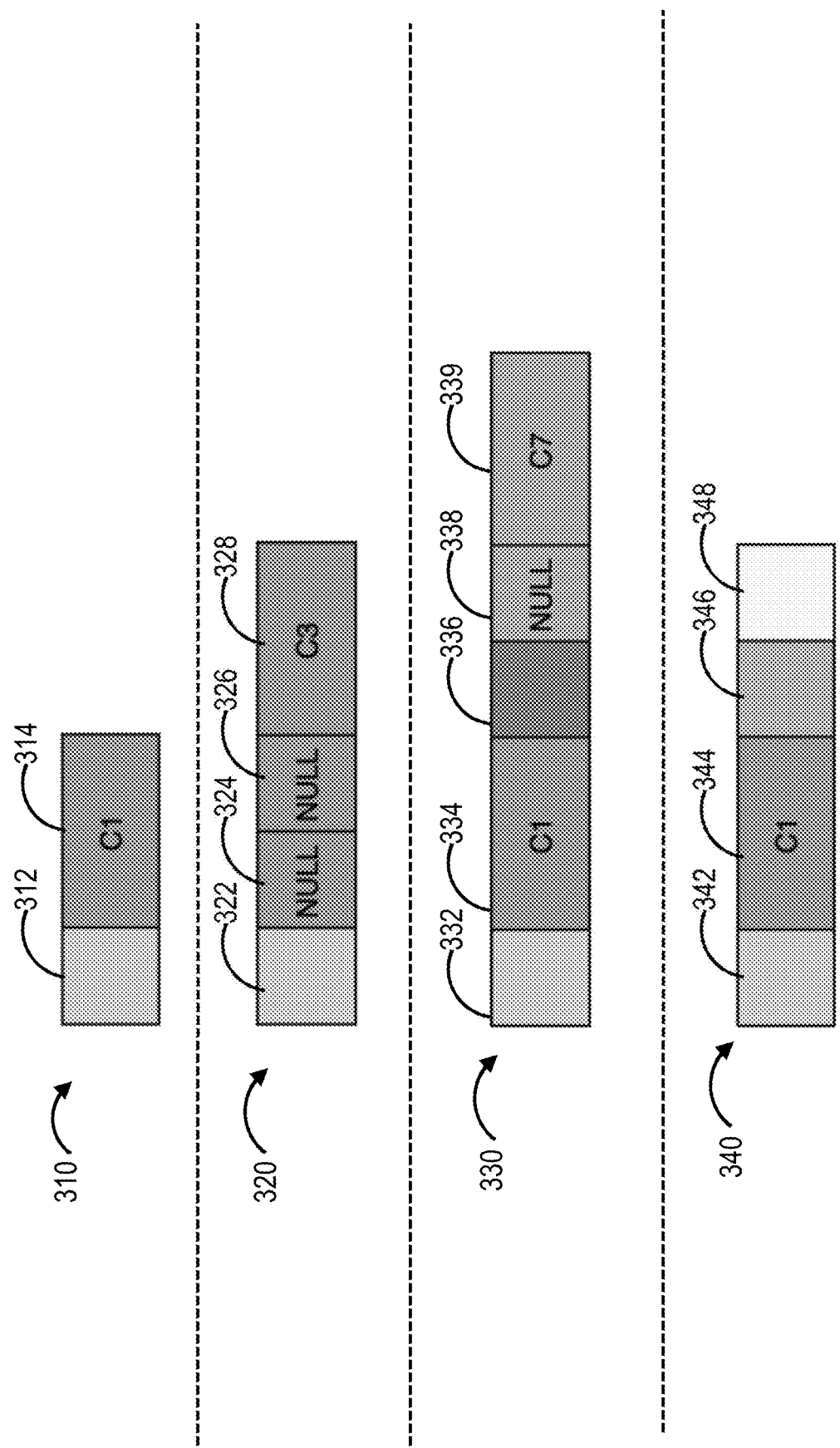
FIG. 3 is a block diagram that depicts example modification scenarios of modifying the example row, in an embodiment.

FIG. 3 is a block diagram that depicts example modification scenarios 310-340 of modifying a row that is similar to row 200 in FIG. 2. While the example database statements herein include single row output functions, embodiments are not so limited. Typical database statements select actual column values and embodiments cover such scenarios.

In modification scenario 310, compute node 120 receives the following database statement:

select count(*) from tiot1 where c1>0

Compute node 120 may pass the entirety of the database statement to storage node 130 or just the name of the database object "tiot1" and the predicate "c1>0," implying that all compute node 120 needs is the data from column C1 of tiot1. In modification scenario 310, what is included in an output data block is one or more rows, each row including a key header 312 and column data from column C1 314, which corresponds to column C1 in FIG. 2. None of the rows in the output data block include column data from any other column, including any column in non-key section 220 and any column in overflow segment 230. Because non-key section 220 is not needed, the output row in modification scenario 310 does not need the non-key header of non-key section 220. Similarly, because overflow segment 230 is not needed, the output row in modification scenario 310 does not require a reference to overflow segment 230. However, key header 312 is updated to indicate that there is no non-key section of the output row. Also, a block header for an output data block that contains this output row (and presumably other output rows) is updated to indicate that the number of key columns is 1.

In modification scenario 320, compute node 120 receives the following statement:

select count(*) from tiot1 where c3>0

Compute node 120 may pass the entirety of the database statement to storage node 130 or just the name of the database object "tiot1" and the predicate "c3>0," implying that all compute node 120 needs is the data from column C3 of tiot1. In modification scenario 320, what is included in an output data block is one or more rows, each row including a key header 322 and column data from column C3 328, which corresponds to column C3 in FIG. 2. None of the rows in the output data block include column data from any other column, including any column in non-key section 220 and any column in overflow segment 230. Also, the block header for a data block that contains this output row (and presumably other output rows) is updated to indicate that the number of key columns is 3. Thus, modification scenario 320 is similar to modification scenario 310, except that because column C3 is preceded by two columns in its definition, the values of columns C1 and C2 (i.e., "unneeded columns") in each output row are replaced with NULL values, which can be much smaller than the actual values in corresponding input row for those columns.

In modification scenario 330, compute node 120 receives the following statement:

select count(c7) from tiot1 where c1>0

In modification scenario 330, what is included in an output data block is one or more rows, each row including a key header 332, column data from column C1 334 (which corresponds to column C1 in FIG. 2), a non-key header 336, a null column 338 for column C6 (which precedes needed column C7), and column data from column C7 339. Thus, both the key section and the non-key section are truncated, the overflow reference is removed, and the unused non-key column is NULLed. The block header for a data block that contains this output row (and presumably other output rows) is updated to indicate that the number of key columns is 1.

In modification scenario 340, compute node 120 receives the following statement:

select count(c10) from tiot1 where c1>0

In modification scenario 340, what is included in an output data block is one or more rows, each row including a key header 342, column data from column C1 344 (which corresponds to column C1 in FIG. 2), a non-key header 346, and an overflow reference 348 to an overflow segment for that input row. Thus, the key section is truncated, the non-key columns of non-key section are removed, and the overflow reference is retained. The block header for a data block that contains this output row (and presumably other output rows) is updated to indicate that the number of key columns is 1.

Compression

Some data blocks are compressed so that more rows or entries may fit in fewer data blocks than would otherwise be required if there was no compression. For example, with compression, an IOT that required one hundred data blocks to store all index segments of the IOT now only requires forty data blocks to store all those index segments.

One example compression technique involves identifying duplicate values across index entries, whether the duplicates are found in a single column or in multiple columns. This type of compression is referred to as duplication reduction compression. For example, the following is set of values that are to be stored in a data block:

TABLE 1

| A | A | B |
| A | A | C |
| A | B | D |
| A | C | D |

Table 1 contains values that are to be stored in a data block. Real-world examples of columns include First Name, Last Name, Salary, and Social Security Number.

Prefix Compression

"Prefix compression" is a specific type of duplication reduction compression. Prefix compression refers to compression where certain columns of a table are considered prefix columns and only those columns are compressed. A "prefix column" is a column where duplicate reduction compression is applied and precedes all other columns that are not compressed. The "suffix" refers to the remainder of the columns once the prefix columns have been removed from a row. A "suffix column" is a column where duplicate reduction compression is not applied. For some data blocks of a database object (e.g., an index or IOT), there may be single prefix column. For other data blocks of the same database object, there may be multiple prefix columns.

While the following description is about prefix compression, embodiments are applicable to suffix compression, where suffix columns are compressed while prefix columns are not. For example, in Table 1, the last column would be subject to compression while the first two columns would not.

A "prefix row" is a portion of a row that contains the value(s) of the prefix columns. Thus, a prefix row is a portion of a row for which duplication is leveraged in order to compress a data block. A prefix row appears only once in a data block. For example, in 1-column prefix compression, the value in the first column is considered a prefix row. In 2-column prefix compression, each pair of values of the prefix columns is considered a prefix row.

A "suffix row" is a portion of a row that contains the value(s) of the suffix columns. Thus, suffix rows are not subject to prefix compression. Accordingly, even though there might be duplicate suffix rows that appear in consecutive rows stored in a data block, each of the duplicate suffix rows will be stored in the data block.

As an example of 1-column prefix compression, duplication in the first (i.e., prefix) column is identified and used to reduce the amount of space that is used to store (in a data block) the values in the first column of Table 1. Thus, the data block stores, for the first column, a single instance of value 'A' (which is in the first prefix row). The values in the second and third columns (i.e., the suffix columns) are stored in their entirety in the data block. Each pair of values is associated with a single instance of the value 'A' from the first (i.e., prefix) column.

As an example of 2-column prefix compression, duplication in the first and second columns (i.e., prefix columns) is identified and used to reduce the amount of space that is used to store (in a data block) the values in the first and second columns of Table 1. Thus, the data block stores, for the first two columns, a single instance of the first prefix row, a single instance of the third prefix row, and a single instance of the fourth prefix row. The values in the third column (i.e., the suffix column in this example) are stored in their entirety in the data block. In this example, there may not be enough duplication in the first two columns to justify the overhead required to maintain information about the three different instances of the first two columns. In other words, compressing the entries depicted in Table 1 using two-column prefix compression may result in negative compression.

If a database object only stores values of a single unique column, then prefix compression cannot be used on data blocks of the database object. If a database object only stores values of a single column and that column is not unique, then prefix compression can be used on data blocks of the database object. If a database object stores values of multiple columns and at least one of the columns is not unique, then prefix compression can be used on data blocks of the database object.

Query Evaluation with Prefix Compression

Figure 4:
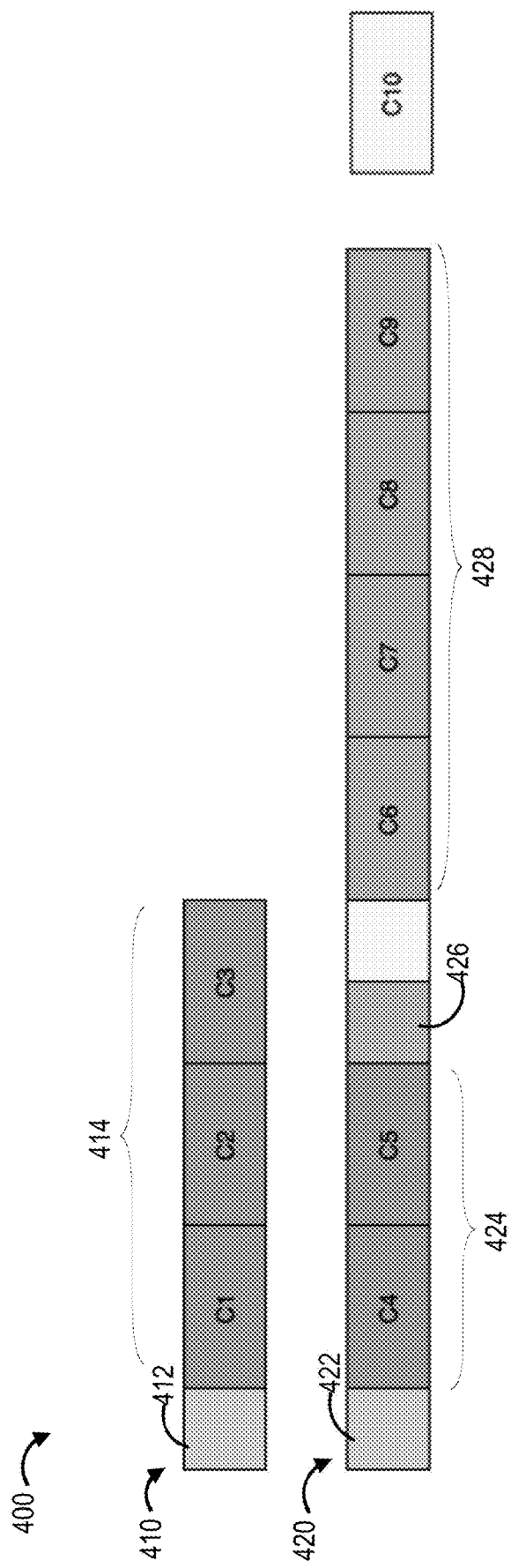
FIG. 4 is a block diagram that depicts an example row that is compressed using prefix compression, in an embodiment.

FIG. 4 is a block diagram that depicts an example row 400 that is subject of prefix compression, in an embodiment. Row 400 includes a prefix 410 and a suffix 420. Prefix 410 includes a prefix header 412 while suffix 420 includes (1) a suffix key header 422 that is similar to key header 212 and (2) a suffix non-key header 426 that is similar to non-key header 222. Suffix 420 also includes a key section (that corresponds to key columns 424, i.e., C4-C5), a non-key section (that corresponds to non-key columns 428, i.e., C6-C9), and an overflow segment (that corresponds to column 10), while prefix 410 only includes a key section that includes key columns 414, i.e., C1-C3.

A header of an input data block that is compressed using prefix compression indicates a number of prefix rows in the data block, a number of suffix rows in the data block, and a number of key columns in the prefix row. Additionally, metadata of the input data block may include an array that comprises one or more entries, each entry corresponding to a different prefix and containing an offset (into the data block) to the prefix and indicating a number of suffix rows for that prefix. In an embodiment where storage node 130 performs query evaluation on such a compressed input data block, storage node 130 updates the block header in the corresponding output data block to indicate a different number of key columns, a different number of prefix rows, and/or a different number of suffix rows. For example, it is possible that no suffix rows are inserted into the output data block if storage node 130 determines that no column in any suffix row is needed for the triggering query. No suffix rows would mean no rows at all, except for any prefix rows. As another example, it is possible that fewer prefix rows are needed in an output data block if applying a predicate results in removing a number of those prefix rows.

Figure 5:
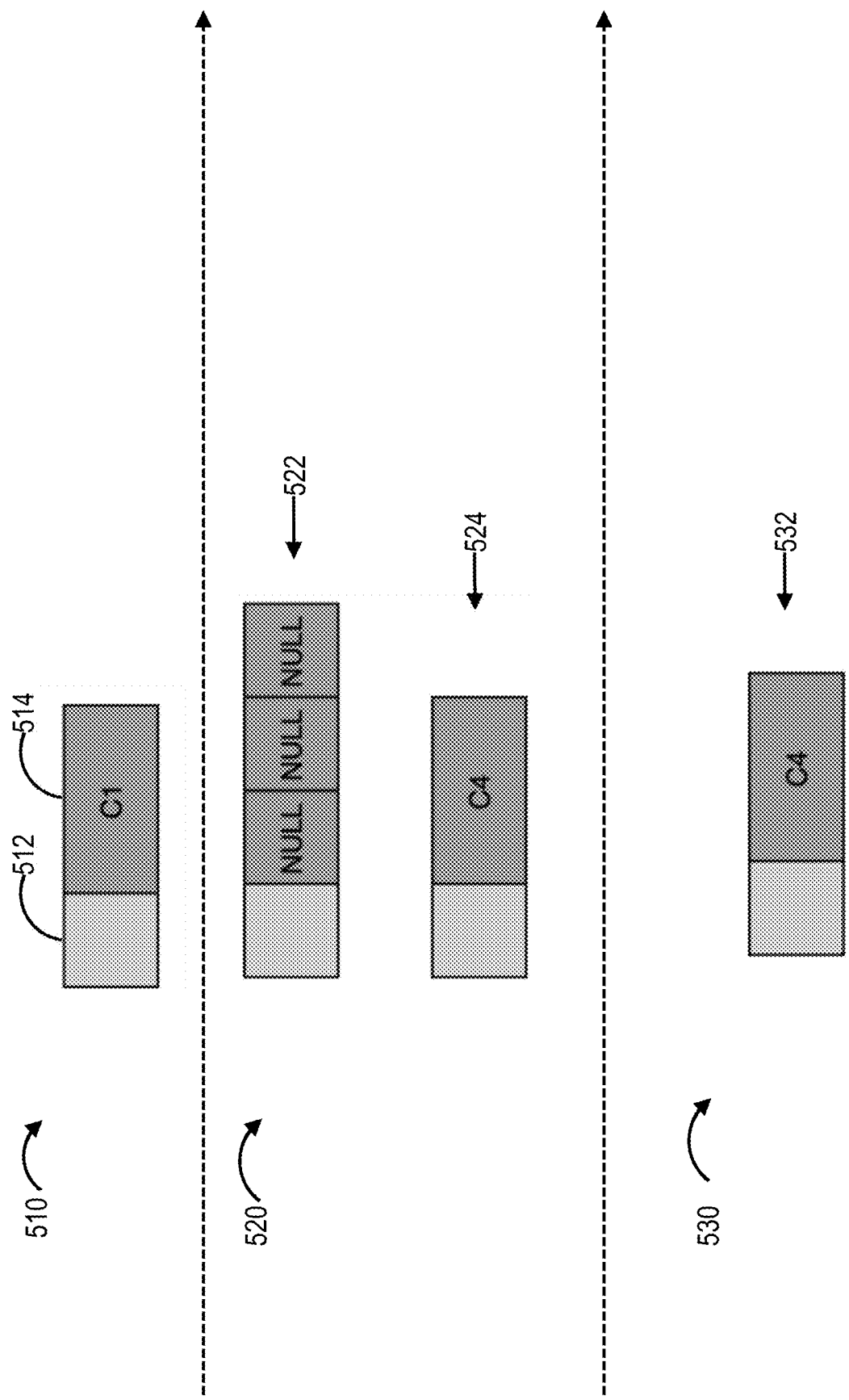
FIG. 5 is a block diagram that depicts example modification scenarios 510-530 of modifying the example compressed row, in an embodiment.

FIG. 5 is a block diagram that depicts example modification scenarios 510-530 of modifying a row that is similar to row 400 in FIG. 4, in an embodiment.

In modification scenario 510, compute node 120 receives the following database statement:

select count(*) from tiot1 where c1>0

Compute node 120 may pass the entirety of the database statement to storage node 130 or just the name of the database object "tiot1" and the predicate "c1>0," implying that all compute node 120 needs is the data from column C1 of tiot1. In modification scenario 510, what is included in an output data block is one or more rows, each row including a key header 512 and column data from column C1 514, which corresponds to column C1 in FIG. 4. Key header 512 may be different than the corresponding key header of compressed row 400. For example, key header 512 may indicate that there is no suffix and/or that there is no non-key portion. The block header for the output data block would indicate that the data block is not compressed and the prefix row is just a "regular" (uncompressed) row.

None of the rows in the output data block include column data from any other column, including any other column in prefix 410 and any column in suffix 420. In other words, all suffix columns are removed, the output data block no longer is compressed (because there is no suffix), and the header for the output data block is updated to indicate that the key column count is 1. Because of this data reduction, additional prefixes from another input data block may be able to fit into this output data block. Thus, the number of prefix rows and the number of suffix rows may be different than any of input data blocks whose data ends up in the output data block. In order to determine the count in the query, one approach for including the number of rows that have C1 as its prefix (even though all the suffix rows can be removed) is to have all suffix rows have a single column with the column value NULL. An optimized version of this approach is to have a phantom suffix where the suffix row does not exist, but the metadata retains the count of a number of suffixes that point to the prefix, which count becomes the count of how many rows have C1 as its prefix.

In modification scenario 520, compute node 120 receives the following database statement:

select count(*) from tiot1 where c4>0

Compute node 120 may pass the entirety of the database statement to storage node 130 or just the name of the database object "tiot1" and the predicate "c4>0," implying that all compute node 120 needs is the data from column C4 of tiot1. In modification scenario 520, what is included in an output data block is one or more rows, each row including a prefix row 522 and a suffix row 524. Because none of the key columns in prefix row 522 are needed by the database statement, each column data in prefix row 522 is NULLed. Also, suffix row 524 is truncated so that columns succeeding column C4 (from row 400) are retained in suffix row 524.

Thus, the output data block for this row is reshaped in at least two ways. First, the entirety of prefix row 522 is NULLed (which allows for more suffix rows per output data block). Second, the key column count is updated to indicate 4. Also, the rows of the output data block are reshaped by the removal of the non-key section.

Modification scenario 530 is similar to modification scenario 520 (including the database statement), except that the layout of the output data block is different. In this scenario, the block header is updated to indicate that the number of key columns is 4, that three key columns exist in a prefix, and that the key columns start at column C4. However, the prefix is a phantom row and does not physically exist. Also, prefix row 410 is removed and row 532 remains, which means that there is no more compression. Thus, row 532 is not treated as a suffix row, but a "regular" uncompressed row. Similar to modification scenario 520, the non-key section is removed.

Compute Node Processing

Compute node 120 receives an output data block from storage node 130. The compute node 120 determines, based on a block header of the output data block, how the data within the output data block is organized and some of the key information found therein, such as the number of key columns, whether the output data block is compressed, and a number of prefix rows and a number of suffix rows (if compressed). The response, from storage node 130, that includes the output data block may include data that identifies the database statement that triggered the generation of the output data block. Also, the response may include data that identifies which query evaluation criteria were evaluated, if any, from the triggering database statement.

Full and Partial Query Evaluation

In an embodiment, all query selection criteria (e.g., filter predicate and/or column projection) of a database statement are evaluated by storage node 130. Any other query evaluation (such a count and PL/SQL functions) are performed by compute node 120. In an optimization, if all query selection evaluation is performed on storage node 130 and it is known that count(*) is the projection, then all rows can be removed from the data block, but the output data block indicate the number of rows that passed evaluation (effectively phantom rows).

In an embodiment, selection criteria of a database statement are categorized as either storage selection criteria or non-storage selection criteria. A storage selection criterion is one that is performed by storage node 130 while a non-storage selection criterion is one that is performed by compute node 120. For example, storage node 130 might not be configured to evaluate certain types of selection criteria, such as selection criteria involving a PL/SQL function. In those cases, compute node 120 evaluates those types of selection criteria.

In a related embodiment, compute node 120 determines which selection criteria of a database statement are storage selection criteria and which selection criteria of the database statement are non-storage selection criteria. Compute node 120 remembers to evaluate only the non-storage selection criteria.

In a related embodiment, storage node 130 informs compute node 120 regarding which selection criteria were or were not evaluated. For example, compute node 120 sends all selection criteria of a database statement to storage node 130, which then determines which selection criteria to evaluate. Storage node 130 identifies which selection criteria it evaluated and/or identifies which selection criteria it did not evaluate. Storage node 130 returns to compute node 120, along with output data blocks, an identification of which selection criteria storage node 130 evaluated and/or which selection criteria storage node 130 did not evaluate.

In a related embodiment, compute node 120 only sends storage selection criteria to storage node 130. In this way, storage node 130 attempts to evaluate each selection criterion, in a data request, that storage node 130 receives from compute node 120. Thus, if all selection criteria of a database statement are storage selection criteria, then compute node 120 sends, to storage node 130, a data request that includes all of the selection criteria. On the other hand, if all selection criteria of a database statement are non-storage selection criteria, then compute node 120 sends, to storage node 130, a data request that does not include any selection criteria of the database statement.

In an embodiment, compute node 120 evaluates storage selection criteria of a database statement even though compute node 120 transmitted that storage predicate to storage node 130. This might occur if storage node 130 has limitations on memory availability. For example, storage node 130 might be processing selection criteria of one or more other database statements that require a significant number of input data blocks to be read into volatile memory of storage node 130 and a signification amount of selection criteria evaluation on those input data blocks. Thus, storage node 130 might not have sufficient computing resources to process the storage selection criterion in question. Storage node 130 may inform compute node 120 that that storage selection criterion was not applied to any of the output data blocks (which may be the input data blocks if no selection criteria were evaluated on the input data blocks).

Process Overview

Figure 6:
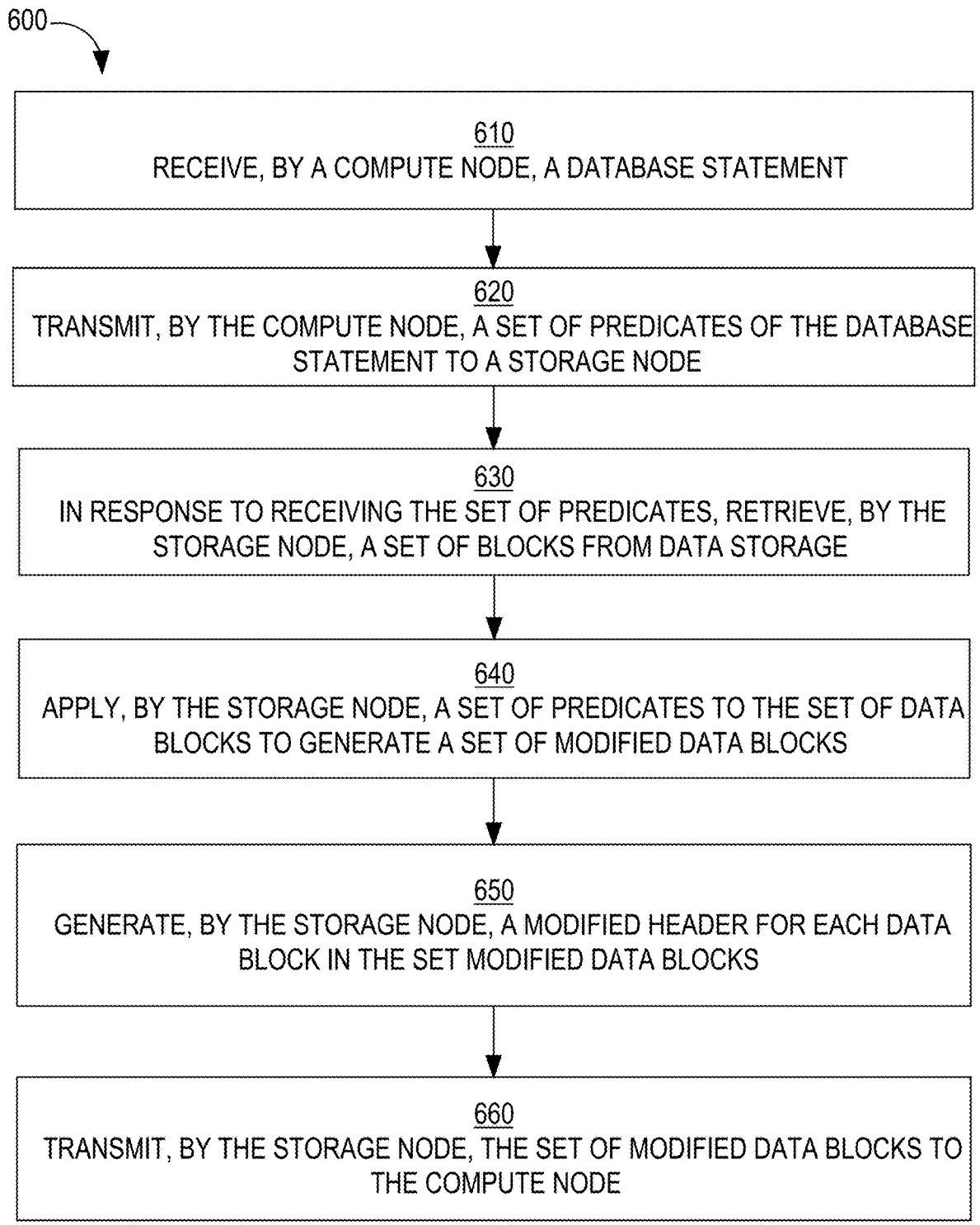
FIG. 6 is a flow diagram that depicts an example process for pushing predict evaluation to a storage node, in an embodiment.

FIG. 6 is a flow diagram that depicts an example process 600 for pushing selection criteria evaluation to a storage node, in an embodiment. Process 600 may be performed by different entities in FIG. 1.

At block 610, compute node 120 receives a database statement from database client 112. The database statement may be transmitted over a network, such as a LAN or the Internet.

At block 620, compute node 120 transmits a set of one or more selection criteria of the database statement to storage node 130. While depicted as separate entities, compute node 120 and storage node 130 may be the same computing node/device, but different processing cores on that computing node/device are dedicated to different functions.

At block 630, in response to receiving the set of one or more selection criteria, storage node 130 retrieves a set of one or more data blocks from storage device 140. Block 630 may involve looking up a directory of database objects by name (e.g., name of a table or index or IOT), where the directory maps object names to an address, whether a logical address or physical address, and requesting the named database object from that address. In response, storage device 140 returns the set of data blocks to storage node 130.

At block 640, storage node 130 applies the set of selection criteria to each data block in the set of data blocks. Block 640 may involve filtering rows, truncating columns, removing non-key sections and references to overflow segments, nulling certain column values, and decompression. Block 640 results in a set of one or more modified output data blocks.

At block 650, storage node 130 generates a modified header for each data block in the set of one or more modified output data blocks. For example, the modified header may indicate a different number of key columns and/or that the output data block is no longer compressed. The modified header may also indicate that all storage selection criteria have been evaluated for every row in the output data block. Block 650 may involve including the modified header in the corresponding modified data block.

At block 660, storage node 130 transmits the set of modified data blocks to a compute node. The compute node may be the same compute node 120 that transmitted the set of selection criteria to storage node 130. Alternatively, the compute node may be a different compute node. For example, the initial compute node 120 may have gone offline (whether a planned shutdown or an unplanned crash) or may be experiencing a heavy computation load and, thus, is not able to finish processing the database statement in a timely fashion.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
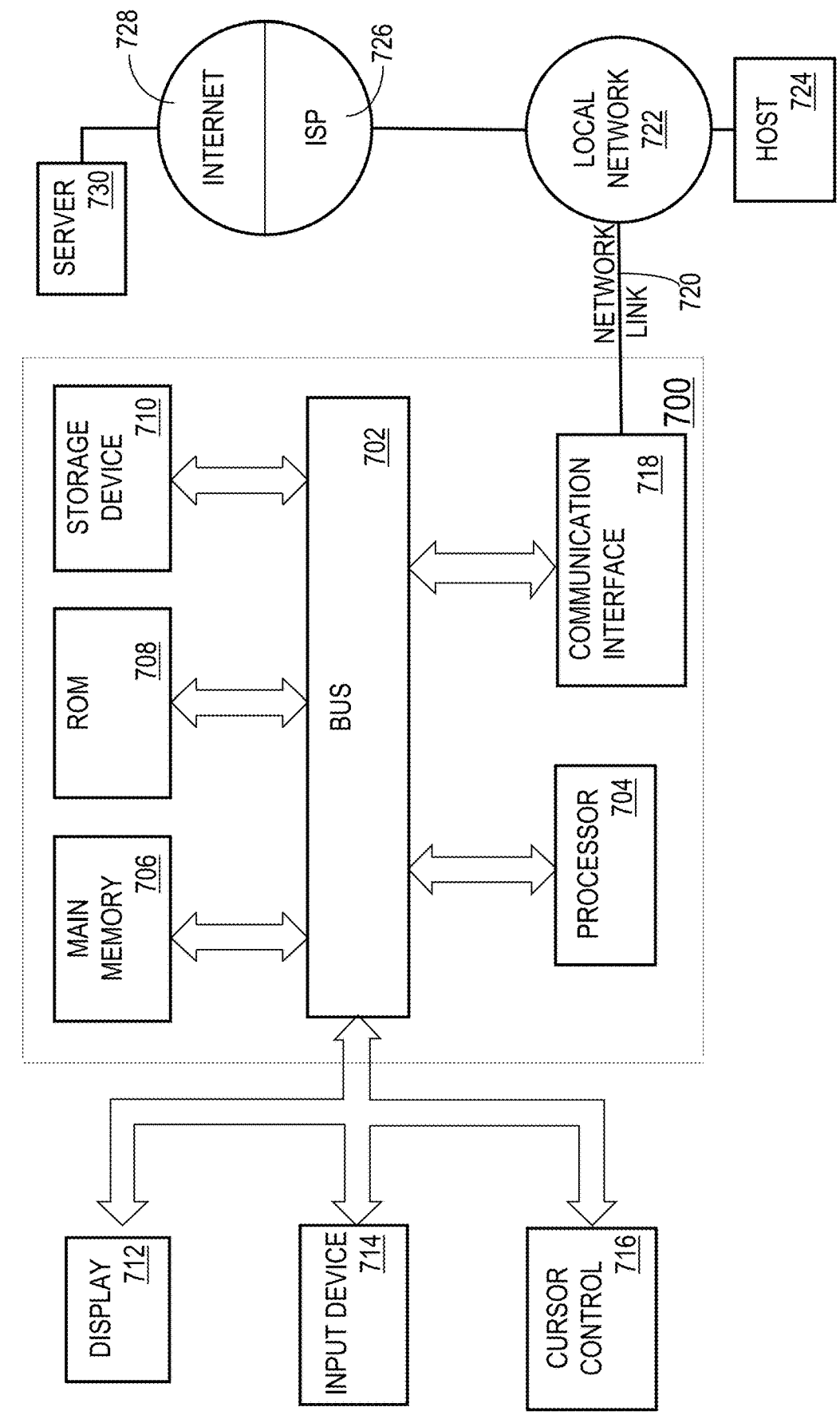
FIG. 7 is a block diagram that illustrates an example computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a database statement at a compute node;
   transmitting, by the compute node, to a storage node, a set of one or more selection criteria that are associated with the database statement;
   based on the database statement, retrieving, by the storage node, a set of data blocks from storage, wherein each data block of the set of data blocks comprises a plurality of rows of a database object;
   applying, by the storage node, the set of one or more selection criteria to a data block in the set of data blocks, wherein applying the set of one or more selection criteria comprises generating a modified data block;
   generating, by the storage node, for the modified data block, modified header data that is different than original header data of the data block;
   after including the modified header data in the modified data block, transmitting the modified data block from the storage node to the compute node;
   wherein the method is performed by one or more computing devices.

2. The method of claim 1, wherein:
   applying the set of one or more selection criteria comprises:
      based on the set of one or more selection criteria, identifying a particular column of the database object;
      identifying one or more columns that are subsequent to the particular column in the database object and that are not involved in a projection in the set of one or more selection criteria;
   generating the modified data block comprises excluding the one or more columns from the modified data block.

3. The method of claim 1, wherein:
   the database object is an index-organized table (IOT);
   each row in the plurality of rows comprises a key section and a non-key section;
   applying the set of one or more selection criteria comprises determining, based on the set of one or more selection criteria, that no column in the non-key section is involved in a projection in the set of one or more selection criteria;
   generating the modified data block comprises excluding the non-key section from the modified data block in response to determining that none of the columns in the non-key section are involved in the projection.

4. The method of claim 1, wherein:
   applying the set of one or more selection criteria comprises:
      based on the set of one or more selection criteria, identifying a particular column of the database object;
      identifying one or more columns that are prior to the particular column in the database object and that are not indicated in the set of one or more selection criteria;
   generating the modified data block comprises, for each row in the plurality of rows, including, in each of the one or more columns, a NULL value.

5. The method of claim 1, wherein:
   the database object is an index-organized table (IOT);

each row in the plurality of rows comprises a key section and a non-key section;
each row of one or more rows in the plurality of rows includes an overflow segment comprising one or more columns;
applying the set of one or more selection criteria comprises, determining, based on the set of one or more selection criteria, that no column in the overflow segment is targeted by the set of one or more selection criteria;
generating the modified data block comprises, excluding, from each row of one or more rows in the modified data block that correspond to the one or more rows in the plurality of rows, a reference to the overflow segment of the corresponding row.

6. The method of claim 1, wherein:
the database object is an index-organized table (IOT);
each row in the plurality of rows comprises a key section and a non-key section;
each row in a subset of the plurality of rows comprises an index segment and an overflow segment;
the index segment comprises a set of one or more columns of the key section;
applying the set of one or more selection criteria comprises:
determining to apply the set of one or more selection criteria to a first row of the plurality of rows based on the first row comprising one or more columns, associated with the set of one or more selection criteria, in the index segment;
determining to not apply the set of one or more selection criteria to a second row of the plurality of rows based on the second row comprising the one or more columns in the overflow segment.

7. The method of claim 1, wherein the set of one or more selection criteria is a first set of one or more selection criteria, wherein the database statement is associated with a second set of one or more selection criteria that is different than the first set of one or more selection criteria, the method further comprising:
determining, by the compute node, to not transmit the second set of one or more selection criteria to the storage node;
after receiving the modified data block from the storage node, applying, by the compute node, the second set of one or more selection criteria to the modified data block.

8. The method of claim 1, further comprising:
determining, by the compute node, how to process the modified data block based on the modified header.

9. The method of claim 1, further comprising:
after receiving the modified data block from the storage node, processing, by the compute node, the modified data block without applying the set of one or more selection criteria to the modified data block.

10. The method of claim 1, wherein:
the database object is an index-organized table (IOT);
each row in the plurality of rows comprises a key section and a non-key section;
the data block is a compressed data block where a portion of the key section is in one or more prefix rows and a portion of the non-key section is in suffix rows;
applying the set of one or more selection criteria comprises:
determining, based on the set of one or more selection criteria, to not include any of the suffix rows in the modified data block.

11. A method comprising:
receiving a database statement at a compute node;
transmitting, by the compute node, to a storage node, a set of one or more selection criteria that are associated with the database statement, wherein the set of one or more selection criteria includes a projection of a first set of one or more columns of an index;
based on the database statement, retrieving, by the storage node, a set of data blocks from storage, wherein each data block of the set of data blocks comprises a plurality of rows;
applying, by the storage node, the set of one or more selection criteria to a data block in the set of data blocks, wherein applying the set of one or more selection criteria comprises removing a second set of one or more columns that is different than the first set of one or more columns, resulting in a modified data block;
transmitting the modified data block from the storage node to the compute node;
wherein the method is performed by one or more computing devices.

12. The method of claim 11, further comprising:
generating, by the storage node, for the modified data block, modified header data that is different than original header data of the data block;
prior to transmitting the modified data block to the compute node, including the modified header data in the data block.

13. The method of claim 11, wherein the index is one of a B-tree index, a compressed index, or index-organized table (IOT).

14. A method comprising:
receiving a database statement at a compute node;
transmitting, by the compute node, to a storage node, a set of one or more selection criteria that are associated with the database statement;
based on the database statement, retrieving, by the storage node, a set of data blocks from storage, wherein each data block of the set of data blocks comprises multiple rows that are compressed;
applying, by the storage node, the set of one or more selection criteria to a data block, in the set of data blocks, that comprises a plurality of rows, wherein applying the set of one or more selection criteria comprises decompressing the plurality of rows that are in the data block, resulting in a decompressed data block that includes a strict subset, of the plurality of rows, that are not compressed;
transmitting the decompressed data block from the storage node to the compute node;
wherein the method is performed by one or more computing devices.

15. One or more storage media storing instructions which, when executed by one or more processors, cause;
receiving a database statement at a compute node;
transmitting, by the compute node, to a storage node, a set of one or more selection criteria that are associated with the database statement;
based on the database statement, retrieving, by the storage node, a set of data blocks from storage, wherein each data block of the set of data blocks comprises a plurality of rows of a database object;
applying, by the storage node, the set of one or more selection criteria to a data block in the set of data blocks, wherein applying the set of one or more selection criteria comprises generating a modified data block;

generating, by the storage node, for the modified data block, modified header data that is different than original header data of the data block;

after including the modified header data in the modified data block, transmitting the modified data block from the storage node to the compute node.

16. The one or more storage media of claim 15, wherein:
applying the set of one or more selection criteria comprises:
based on the set of one or more selection criteria, identifying a particular column of the database object;
identifying one or more columns that are subsequent to the particular column in the database object and that are not involved in a projection in the set of one or more selection criteria;
generating the modified data block comprises excluding the one or more columns from the modified data block.

17. The one or more storage media of claim 15, wherein:
the database object is an index-organized table (IOT);
each row in the plurality of rows comprises a key section and a non-key section;
applying the set of one or more selection criteria comprises determining, based on the set of one or more selection criteria, that no column in the non-key section is involved in a projection in the set of one or more selection criteria;
generating the modified data block comprises excluding the non-key section from the modified data block in response to determining that none of the columns in the non-key section are involved in the projection.

18. The one or more storage media of claim 15, wherein:
applying the set of one or more selection criteria comprises:
based on the set of one or more selection criteria, identifying a particular column of the database object;
identifying one or more columns that are prior to the particular column in the database object and that are not indicated in the set of one or more selection criteria;
generating the modified data block comprises, for each row in the plurality of rows, including, in each of the one or more columns, a NULL value.

19. One or more storage media storing instructions which, when executed by one or more processors, cause;
receiving a database statement at a compute node;
transmitting, by the compute node, to a storage node, a set of one or more selection criteria that are associated with the database statement, wherein the set of one or more selection criteria includes a projection of a first set of one or more columns of an index;
based on the database statement, retrieving, by the storage node, a set of data blocks from storage, wherein each data block of the set of data blocks comprises a plurality of rows;
applying, by the storage node, the set of one or more selection criteria to a data block in the set of data blocks, wherein applying the set of one or more selection criteria comprises removing a second set of one or more columns that is different than the first set of one or more columns, resulting in a modified data block;
transmitting the modified data block from the storage node to the compute node.

20. One or more storage media storing instructions which, when executed by one or more processors, cause:
receiving a database statement at a compute node;
transmitting, by the compute node, to a storage node, a set of one or more selection criteria that are associated with the database statement;
based on the database statement, retrieving, by the storage node, a set of data blocks from storage, wherein each data block of the set of data blocks comprises multiple rows that are compressed;
applying, by the storage node, the set of one or more selection criteria to a data block, in the set of data blocks, that comprises a plurality of rows, wherein applying the set of one or more selection criteria comprises decompressing the plurality of rows that are in the data block, resulting in a decompressed data block that includes a strict subset, of the plurality of rows, that are not compressed;
transmitting the decompressed data block from the storage node to the compute node.

21. The one or more storage media of claim 15, wherein:
the database object is an index-organized table (IOT);
each row in the plurality of rows comprises a key section and a non-key section;
each row of one or more rows in the plurality of rows includes an overflow segment comprising one or more columns;
applying the set of one or more selection criteria comprises, determining, based on the set of one or more selection criteria, that no column in the overflow segment is targeted by the set of one or more selection criteria;
generating the modified data block comprises, excluding, from each row of one or more rows in the modified data block that correspond to the one or more rows in the plurality of rows, a reference to the overflow segment of the corresponding row.

22. The one or more storage media of claim 15, wherein:
the database object is an index-organized table (IOT);
each row in the plurality of rows comprises a key section and a non-key section;
each row in a subset of the plurality of rows comprises an index segment and an overflow segment;
the index segment comprises a set of one or more columns of the key section;
applying the set of one or more selection criteria comprises:
determining to apply the set of one or more selection criteria to a first row of the plurality of rows based on the first row comprising one or more columns, associated with the set of one or more selection criteria, in the index segment;
determining to not apply the set of one or more selection criteria to a second row of the plurality of rows based on the second row comprising the one or more columns in the overflow segment.

23. The one or more storage media of claim 15, wherein the set of one or more selection criteria is a first set of one or more selection criteria, wherein the database statement is associated with a second set of one or more selection criteria that is different than the first set of one or more selection criteria, wherein the instructions, when executed by the one or more processors, further cause:
determining, by the compute node, to not transmit the second set of one or more selection criteria to the storage node;
after receiving the modified data block from the storage node, applying, by the compute node, the second set of one or more selection criteria to the modified data block.

24. The one or more storage media of claim 15, wherein the instructions, when executed by the one or more processors, further cause:
   determining, by the compute node, how to process the modified data block based on the modified header.

25. The one or more storage media of claim 15, wherein the instructions, when executed by the one or more processors, further cause:
   after receiving the modified data block from the storage node, processing, by the compute node, the modified data block without applying the set of one or more selection criteria to the modified data block.

26. The one or more storage media of claim 15, wherein:
   the database object is an index-organized table (IOT);
   each row in the plurality of rows comprises a key section and a non-key section;
   the data block is a compressed data block where a portion of the key section is in one or more prefix rows and a portion of the non-key section is in suffix rows;
   applying the set of one or more selection criteria comprises:
      determining, based on the set of one or more selection criteria, to not include any of the suffix rows in the modified data block.

27. The one or more storage media of claim 19, wherein the instructions, when executed by the one or more processors, further cause:
   generating, by the storage node, for the modified data block, modified header data that is different than original header data of the data block;
   prior to transmitting the modified data block to the compute node, including the modified header data in the data block.

28. The one or more storage media of claim 19, wherein the index is one of a B-tree index, a compressed index, or index-organized table (IOT).

* * * * *

UNITED STATES PATENT AND TRADEMARK OFFICE
CERTIFICATE OF CORRECTION

PATENT NO. : 12,265,532 B2
APPLICATION NO. : 18/072222
DATED : April 1, 2025
INVENTOR(S) : Shergill et al.

Page 1 of 1

It is certified that error appears in the above-identified patent and that said Letters Patent is hereby corrected as shown below:

In the Specification

In Column 3, Line 41, delete "monkey" and insert -- nonkey --, therefor.

In Column 3, Line 54, delete "overflow;" and insert -- overflow. --, therefor.

In Column 4, Line 1, delete "overflow;" and insert -- overflow. --, therefor.

In Column 12, Line 40, delete "that that" and insert -- that --, therefor.

In the Claims

In Column 20, Line 54, in Claim 15, delete "cause;" and insert -- cause: --, therefor.

In Column 21, Line 46, in Claim 19, delete "cause;" and insert -- cause: --, therefor.

Signed and Sealed this
Seventeenth Day of June, 2025

Coke Morgan Stewart
*Acting Director of the United States Patent and Trademark Office*